United States Patent [19]

Rindfuss

[11] Patent Number: 4,841,387
[45] Date of Patent: Jun. 20, 1989

[54] ARRANGEMENT FOR RECORDING AND INDEXING INFORMATION

[76] Inventor: Diane J. Rindfuss, 395 Oak Creek Dr., Wheeling, Ill. 60090

[21] Appl. No.: 133,336

[22] Filed: Dec. 15, 1987

[51] Int. Cl.⁴ ............................................. G11B 15/18
[52] U.S. Cl. ...................................................... 360/72.1
[58] Field of Search ......................................... 360/72.1

[56] References Cited

U.S. PATENT DOCUMENTS

| | | | |
|---|---|---|---|
| 3,401,470 | 9/1968 | Gaven | 35/9 |
| 3,511,509 | 5/1970 | Firestone | 274/9 |
| 3,516,175 | 6/1970 | Kobler et al. | 35/8 |
| 3,522,665 | 8/1970 | Kalt | 35/9 |
| 3,540,132 | 11/1970 | Glass et al. | 35/8 |
| 3,662,078 | 5/1972 | Holiday | 35/9 A |
| 3,691,650 | 9/1972 | Arnold et al. | 35/8 A |
| 3,996,671 | 12/1976 | Foster | 35/8 A |
| 4,178,698 | 12/1979 | Cornell | 35/8 A |
| 4,184,147 | 1/1980 | Seelbach | 340/146.3 SY |
| 4,375,080 | 2/1983 | Barry et al. | 364/551 |
| 4,422,105 | 12/1983 | Rodesch et al. | 360/72.1 |
| 4,425,586 | 1/1984 | Miller | 358/335 |
| 4,525,148 | 6/1985 | Narayanan | 434/340 |
| 4,641,203 | 2/1987 | Miller | 358/335 |
| 4,677,501 | 6/1987 | Saltzman et al. | 360/72.1 |

*Primary Examiner*—Robert S. Tupper

[57] ABSTRACT

An arrangement for recording information relating to an event on a recording medium, such as an audio or video tape, and for indexing handwritten notations concerning the event to the recorded information, comprises a recording device, a designated writing surface, sensors for sensing the relative positions of the recorded information on the recording medium and the corresponding handwritten notations on the writing surface, a microprocessor for correlating the respective positions of the recorded and handwritten information, and playback mechanisms for locating and reproducing portions of the recorded information in response to identification of corresponding portions of the handwritten notations. In the preferred embodiment, the microprocessor receives information relating to the relative positions of the recorded information and the handwritten notations from the recording device and the writing surface, respectively, and stores this information in a correlation table. When a user wishes to review a portion of the recorded information, which corresponds to a portion of the handwritten notations, the handwritten portion is identified and the device automatically locates and replays the corresponding portion of the recorded information. In the preferred embodiment, the writing surface is an electronic touchpad, or similar device, which provides positional information to the microprocessor as the handwritten notations are made, and which allows the user to identify portions of the handwritten notations regarding which the recorded information is to be reviewed.

34 Claims, 14 Drawing Sheets

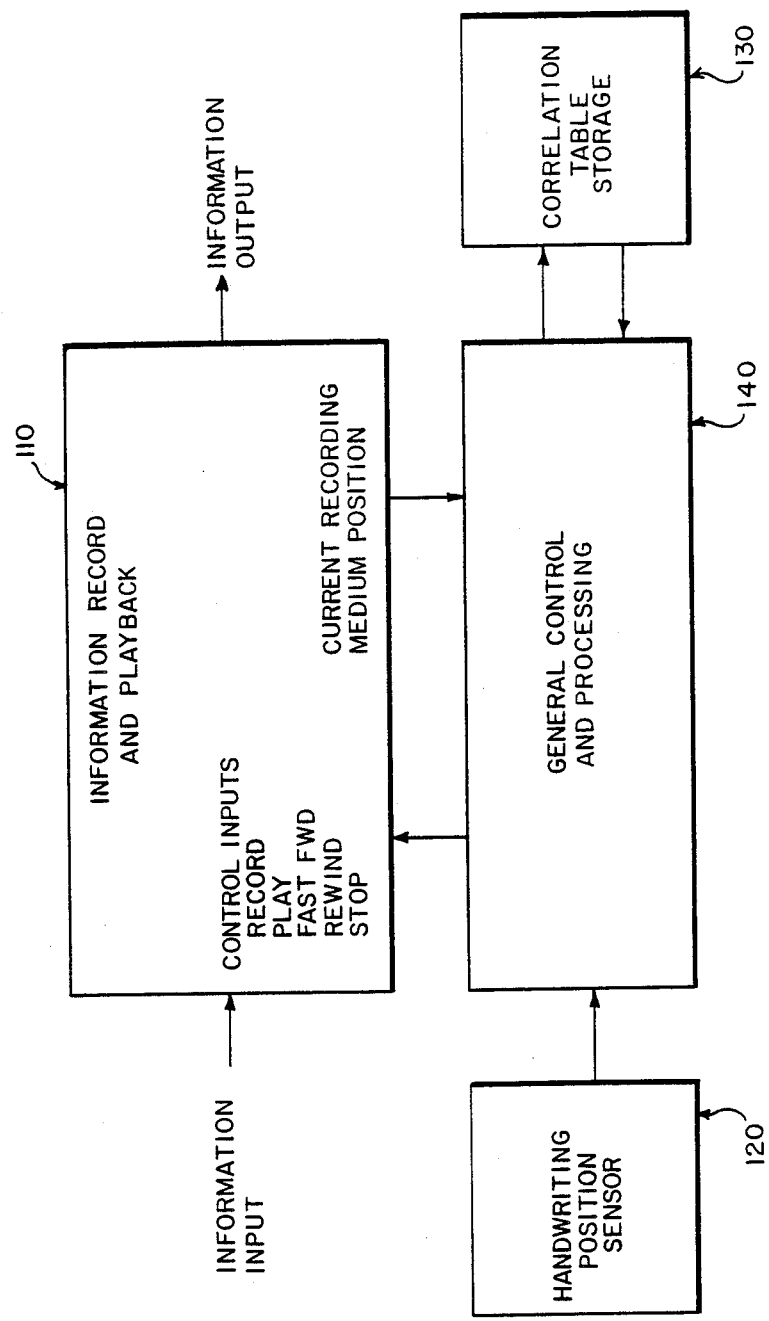

ARRANGEMENT FOR RECORDING AND INDEXING INFORMATION

BACKGROUND AND SUMMARY OF THE INVENTION

This invention relates generally to recording devices and, more particularly, to an arrangement for recording information relating to an event on a recording medium and for indexing handwritten notes concerning the event to the recorded information.

Before the advent of audio recorders, the average person had to rely on handwritten notes taken while attending a lecture, meeting, interview or similar event for later study or review of what had transpired. However, it is often difficult to concentrate on what is being said while trying to take clear and concise notes. An important point may be unclear, misleading or completely missing in the handwritten notes.

The development of smaller and less expensive audio recorders has led to the increasingly common practice of recording a lecture or meeting without taking notes, or to use such recordings to augment handwritten notes. Use of a recording without handwritten notes, however, means that the entire tape must be reviewed in order to refresh one's memory and insure that none of the important points were missed. Since this may require a great deal of time, many people use the audio recording to augment handwritten notes. The handwritten notes are used as the main source for review, with the recording serving as a secondary source if something is unclear in the written notes. However, it may often be difficult to find the exact section of audio tape pertaining to an item of interest in the handwritten notes without the expenditure of considerable time and effort.

To alleviate some of the problems associated with review of audio tapes, audio recorders are often provided with voice activated circuits and/or speed up circuits. The voice activated recorders compress the amount of information on the audio tape by recording only when activated by sound, thus eliminating silent spots on the tape. Speed up circuits in audio recorders allow the user to listen to the tape at a faster speed, while maintaining intelligible voice clarity. Thus, while improvements have been made in the compression of information and speed of review, the prior art has heretofore not provided apparatus which allows the user to quickly and easily find the section of audio tape that corresponds to an item of interest in the handwritten notes.

The above remarks, and much more of the discussion which follows, are put in terms relating to audio recording technology. However, it should be readily apparent that much of the same is equally applicable to video and other recording technologies. Accordingly, the scope of the present invention is not limited to applications relating solely to audio recording techniques.

An object of the present invention is to provide a user of the invention with the ability for recording information relating to an event (such as a meeting, lecture, interview, or similar event) on a recording medium (such as an audio cassette tape), and for indexing handwritten notes concerning the event to the recorded information. When the user subsequently reviews the notes, portions of the recording which correspond to items of interest in the handwritten notes may be found quickly and replayed by simply "pointing" to or otherwise identifying the corresponding portion of the handwritten notes.

This object is attained by an arrangement which includes a recording device for recording information onto a recording medium, a writing surface for receiving handwritten notations, apparatus for sensing relative positions of the recorded information on the recording medium and for sensing positions of corresponding handwritten notations on the writing surface, apparatus for correlating the respective positions of the recorded information to the positions of the handwritten notations, and playback apparatus for locating and reproducing portions of the recorded information in response to identification of corresponding portions of the handwritten notations. In a preferred embodiment of the invention, the apparatus for correlating the respective positions of the recorded information and handwritten notations includes a microprocessor which receives, from the recording device and the writing surface, information relating to the relative positions of the recorded information and the handwritten notations on the recording medium and writing surface, respectively. This information is preferably stored in a correlation table. When a user of the present invention desires to review a portion of the recorded information, the position of the handwritten notes which correspond to the desired portion is identified and compared by the microprocessor to the positions in the correlation table. When a match is located, the corresponding position of the recorded information is identified and the selected portion is located and reproduced for review by the user.

A preferred embodiment of the present invention uses an electronic touchpad as the writing surface, a microcassette audio recorder for the recording device, a microprocessor to control the various elements of the device and to perform the indexing function, a keypad for user input and control of the device, and an alphanumeric display for information feedback to the user. This preferred embodiment of the invention is battery-powered and portable, and resembles a slightly enlarged notepad (see FIG. 1).

An electronic touchpad is a flat pressure sensitive device which can generate varying voltages that correspond to the position of a pin or stylus pressing against its surface allowing an external means to determine the position of said pen or stylus. Such devices are manufactured by several companies, including Elographics, Inc. of Oak Ridge, Tenn., their model number E-233-DG being an example.

In the recording mode, the device makes an audio recording of the event on a standard cassette tape. Simultaneously, the electronic touchpad senses the position of the user's hand-written notes on the writing surface, and provides this information to the microprocessor which correlates the record of the positions of the handwritten notations on each page with the position of the recorded information on the audio tape at corresponding instants in time. At the end of the recording phase, the directory of accumulated recorded positions (in the form of a correlation table) is stored on the cassette tape.

In the review mode, the touchpad senses the position to which the user is pointing on a page of notes positioned on the electronic touchpad. This position is compared to the positions in the directory that were identified and accumulated during the recording mode. When a match is found, the device notes the audio tape position with corresponds with the user notation position in the directory, locates the tape position on the cassette tape, and begins playback of the recording.

Other objects, advantages and novel features of the present invention will become apparent from the following detailed description of the invention when considered in conjunction with the accompanying drawings.

BRIEF DESCRIPTION OF THE DRAWINGS

FIG. 2 is a generalized block diagram of the present invention.

DETAILED DESCRIPTION OF THE DRAWINGS

Figure 1:
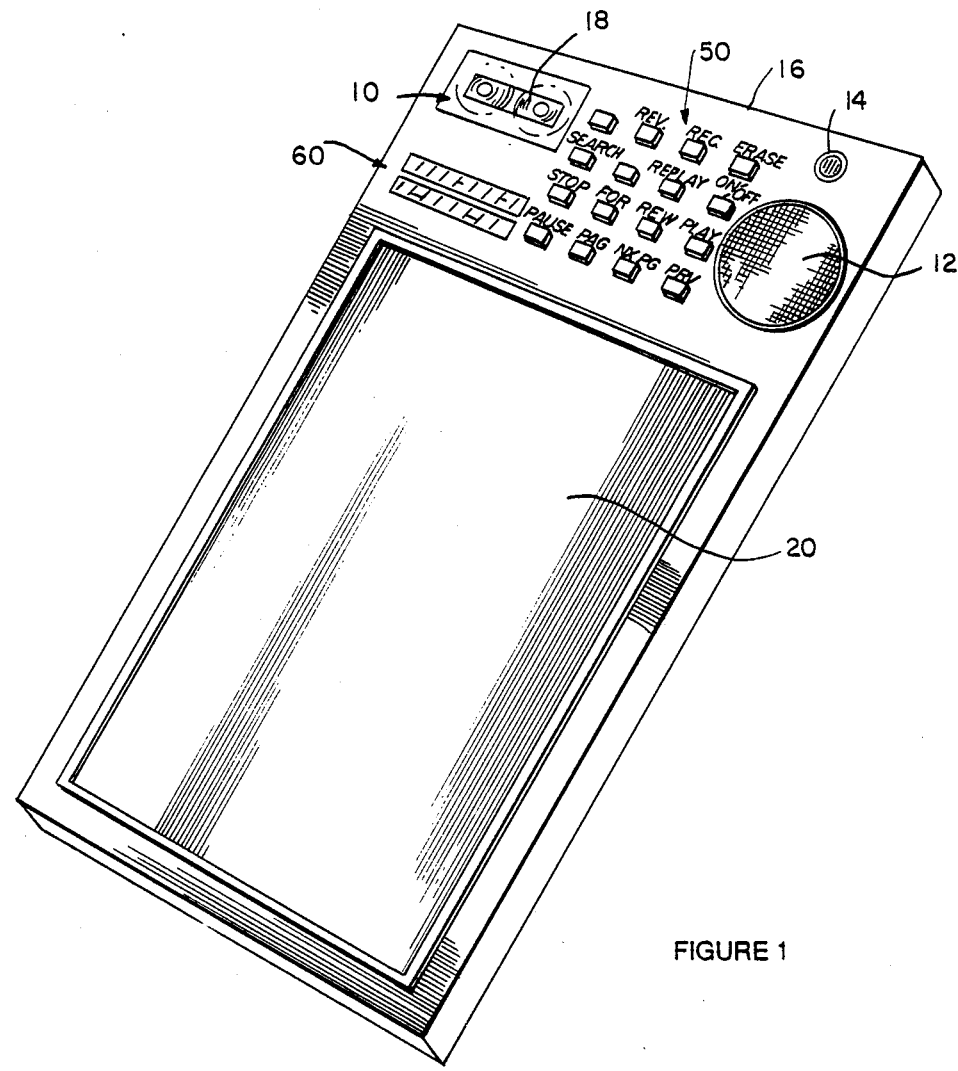
FIG. 1 is a perspective view of a preferred embodiment of the present invention.

The following detailed description uses like reference numerals for like components where appropriate for additional clarity.

FIG. 1 shows a perspective view of a preferred embodiment of the present invention. The embodiment includes audio recorder 10, microphone 14 and speaker 12, which are preferably integrated into a unified enclosure or housing indicated generally by reference numeral 16. Inserted in the audio recorder 10 is a conventional audio cassette 18 having a section at the beginning of the audio tape allocated for digital recording of correlation information, with the remaining section of audio tape allocated for audio recording (see FIG. 4).

Also shown in FIG. 1 is an electronic touchpad 20 used as a writing surface for a standard sheet of paper, a keypad 50 for user input and control of the invention, and an alpha-numeric display 60 to provide information feedback to the user.

FIG. 2 depicts the present invention in generalized block diagram form. In the diagram of FIG. 2, the invention has been divided into four subsystems, numbered 110, 120, 130 and 140, respectively, each of which are briefly discussed below.

The information record and playback subsystem 110 represents a generalized means for recording and replaying information in audio, video, motion picture, or other format. The information is presumed to be of a continuous nature, such as the type of information normally recorded by a tape recorder, rather than "instantaneous" information such as might be recorded by a still photograph. However, the information stream need not be truly continuous. For example, an audio recording medium (such as a tape) might automatically stop when no sound is received, and automatically restart when sound is detected. Any notes taken during the stopped mode would refer to the stopped position of the recording medium. Subsystem 110 records the information in such a manner that a "position" can be associated with discrete time intervals during the recording process. This position can later be utilized to locate the respective time intervals of the recording, such that information replayed for any given position in the playback mode represents the identical information which was recorded at that position during the recording mode.

In addition to the record and playback functions, subsystem 110 provides means to quickly change the current position of the recording medium to where recording or playback is to occur, namely the Rewind and Fast-Forward modes. A Stop function is provided to allow any of the various modes of operation to be terminated.

Information record and playback subsystem 110 also provides means for externally determining the current position of the recording medium. By appropriate externally generated commands, the recording medium can be positioned as desired, and information can be recorded or played back from that position. In addition, the changing position of the medium can be monitored continuously during any of the operating modes.

The handwriting position sensor subsystem 120 provides information as to whether writing on the designated writing surface is occurring, and if so, the coordinates of the location where that writing is occurring. This information is preferably provided on a continuous basis. Subsystem 120 also senses the coordinates of the position in the handwritten notes which has been identified (for example, by pressing on the electronic touchpad with finger, stylus, pen, etc.) by the user.

The correlation table storage system 130 represents the means for saving the correlation table information generated during the record mode, or otherwise provided to the device. This table is composed of corresponding points which indicate the position of recorded information on the recording medium, and the corresponding position of handwritten notes as sensed by the handwriting position sensor. This information is stored for subsequent playback when it is used to determine the desired starting position for playing back a portion of the recorded information which relates to an identified set of coordinates produced by the handwriting position sensor subsystem 120. Correlation table storage may be provided by any of a number of storage techniques (e.g., in a separately provided random access memory). However, in the preferred embodiment of the present invention, it is considered especially advantageous to provide for storage of the correlation table on the recording medium in the information record and playback subsystem 110.

The general control and processing subsystem 140 represents the means by which control of the other systems is effected. Subsystem 140 monitors the position of the recording medium, accepts coordinates which identifies the location of handwritten notes from the handwriting position sensor subsystem, generates a correlation table and stores the table in the correlation table storage subsystem, searches the correlation table during the review mode, retrieves the correlation table from storage, provides feedback to the user through the alphanumeric display, and provides the appropriate control inputs to the information record and playback subsystem in response to the user's actions. In a preferred embodiment of the invention, general control and processing subsystem 140 includes a microprocessor which is used to accomplish many of these control tasks.

Figure 3:
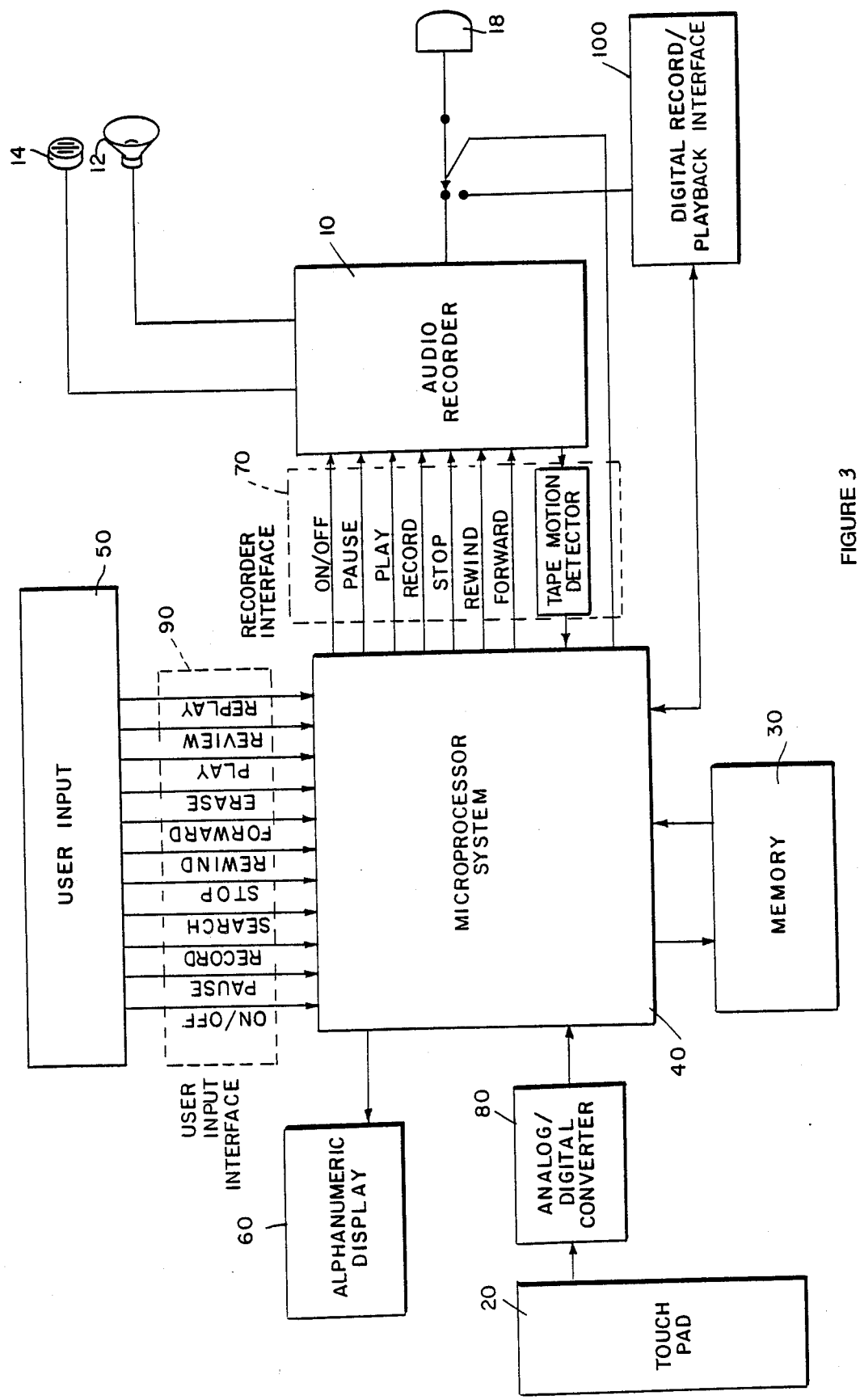
FIG. 3 is a more detailed block diagram of a preferred embodiment of the present invention.

FIG. 3 is a more detailed block diagram of a preferred embodiment of the present invention. User input keypad 50 is connected to microprocessor 40 through user input interface 90 which relays the commands necessary for user control of the invention (i.e., pause, record, search, stop, rewind, forward, erase, play, review, replay and on/off) to microprocessor 40.

Microprocessor 40 receives positional coordinates of the handwritten notations of the user from electronic touchpad 20 through an analog/digital converter 80. Microprocessor 40 provides feedback to the user through alphanumeric display 60. Memory 30 is provided for use by microprocessor 40 in processing the various commands and input signals. Memory 30 may also be used for temporary storage of the positional information received from touchpad 20 and tape motion detector 72 (see below). If desired, some degree of permanent storage in memory 30 may also be provided, including storage of correlation tables for one or more cassettes.

Audio recorder 10 comprises a microphone 14, a speaker 12 and a record/playback head 16. Audio recorder 10 is controlled by microprocessor 40 via recorder interface 70. Modes of operation included in recorder interface 70 are on/off, pause, play, record, stop, rewind and forward. Also incorporated into recorder interface 70 is a tape motion detector 72 which microprocessor 40 uses to monitor the position of audio tape 18 in the recorder while the device is in operation. An analog/digital control line 74 is also included in recorder interface 70 to switch record/playback head 16 between the audio record/playback circuitry and the digital record/playback circuitry. The digital correlation information accumulated by microprocessor 40 during the record mode is stored in memory 30 until it can be subsequently stored on a portion of the audio tape via digital record/playback interface 100. When microprocessor 40 needs the correlation information for the review mode, the information is retrieved from the audio tape through digital record/playback interface 100 and stored in memory 30.

Figure 4:
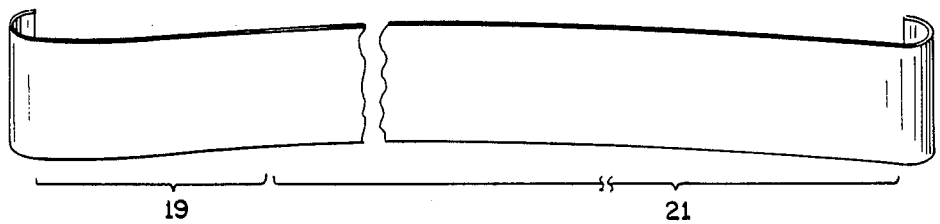
FIG. 4 depicts, in representative form, the preferred allocation of the audio tape for digital information and audio information recorded by the preferred embodiment.

FIG. 4 is a diagrammatic representation of one 30 minute side of a standard 60 minute audio cassette tape, such as is used in audio cassette 18 which is positioned in audio recorder 10. A predetermined length 19 at the beginning of the audio tape is reserved for the digital recording of correlation information accumulated by microprocessor 40 during the recording mode of the invention. The remainder 21 of the audio tape is used for the audio information stored during the recording mode of the invention.

Figure 5:
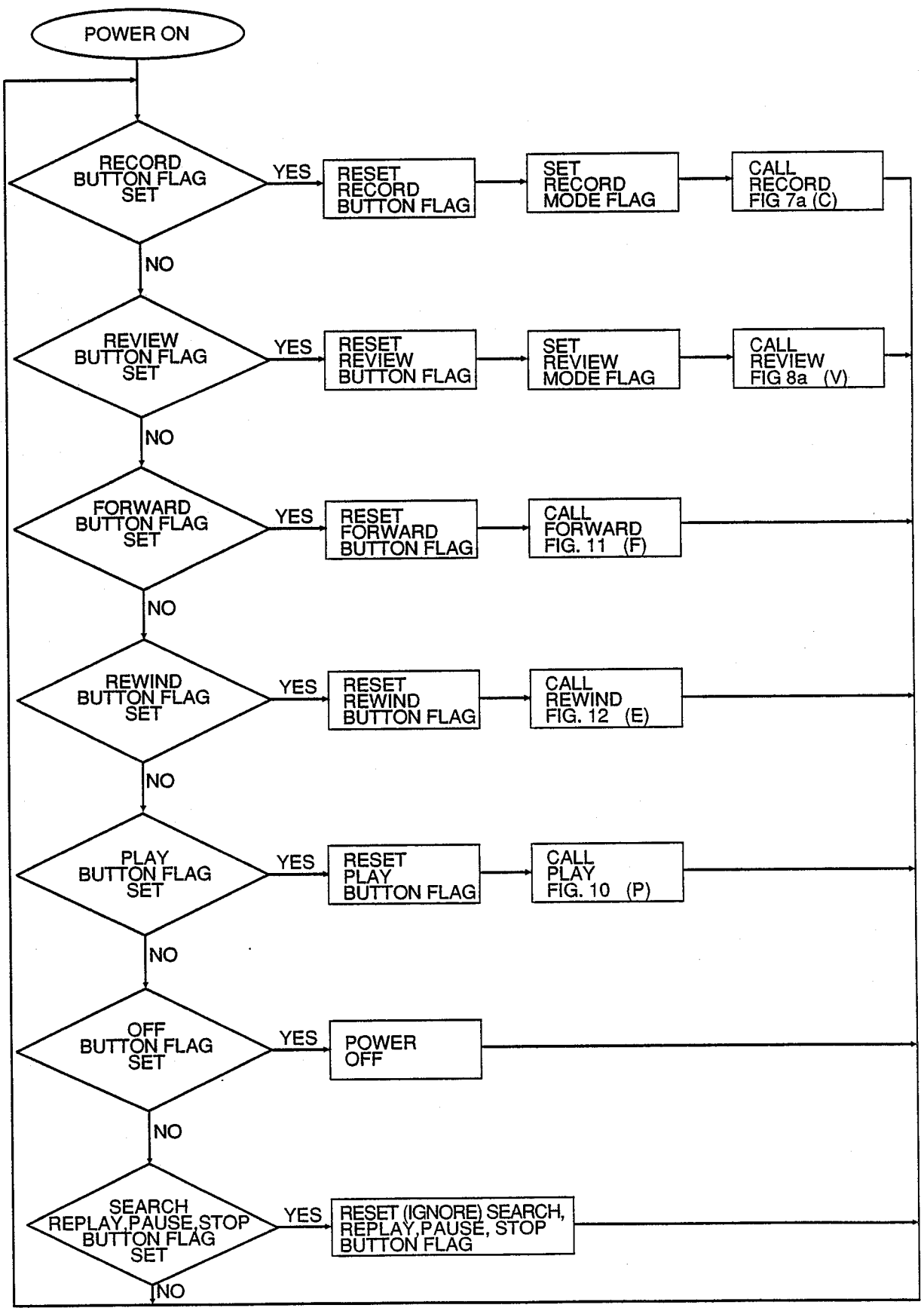
FIGS. 5-12 are flow charts which illustrate the operation of the software in the preferred embodiment of the present invention.

FIGS. 5–12 are flow charts which illustrate the workings of the software used by microprocessor 40 in the preferred embodiment of the present invention. The flow chart of FIG. 5 illustrates the main subroutine which continuously checks to see if the record, review, forward, rewind, play, or off commands have been received. If so, the flag is reset and the command is implemented. Note that if a search, replay, pause, or stop command is received prior to receipt of a record, review, forward, rewind, or play command, the respective flag is reset and the command is ignored. This prevents the recording device from responding to a search, replay, pause, or stop command inadvertently or inappropriately selected by the operator.

Figure 6:
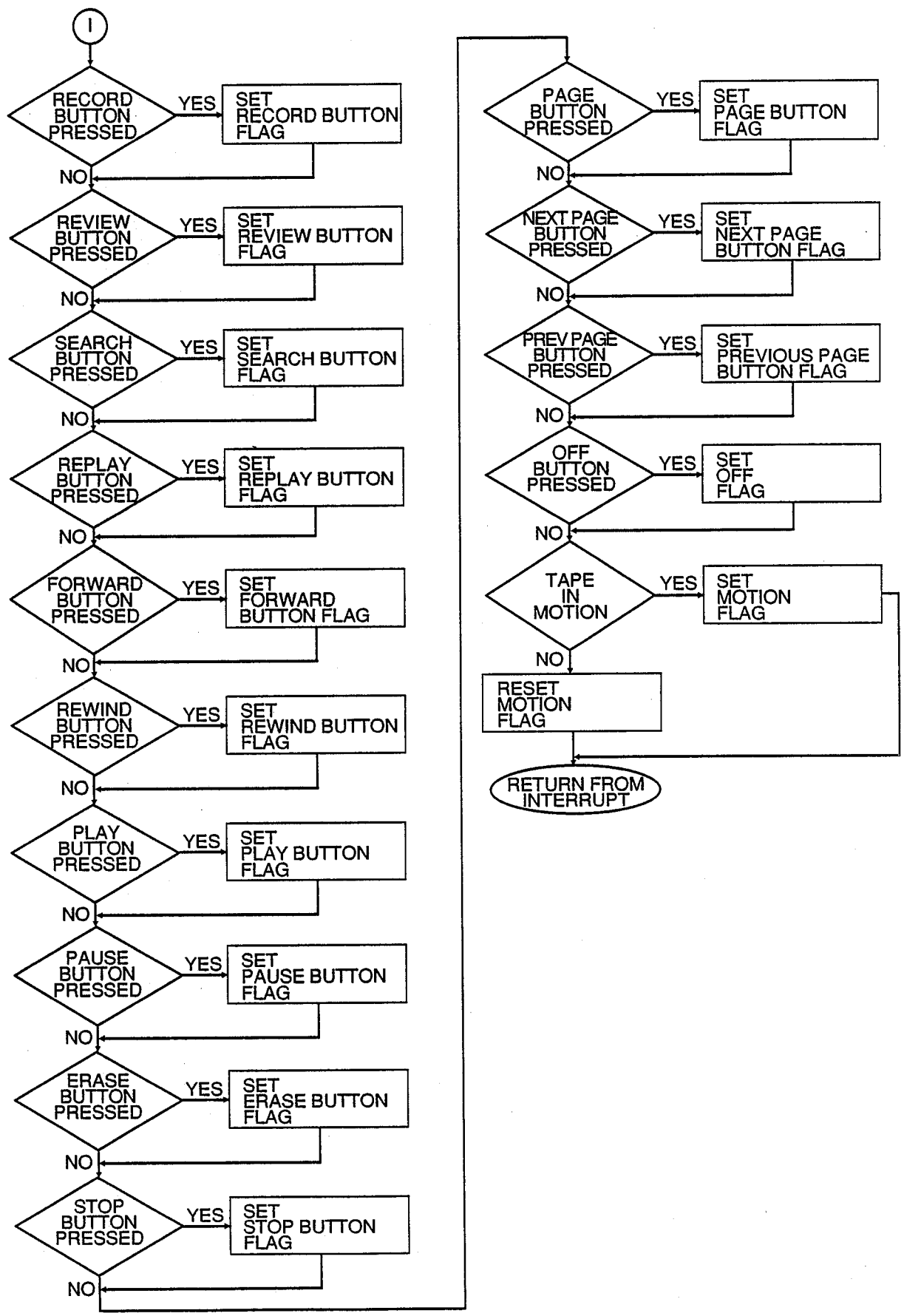

The flow chart of FIG. 6 illustrates the interrupt routine for scanning the keypad to detect the input of operator commands. This interrupt routine is automatically invoked every 10 milliseconds by a timer interrupt within the microprocessor. Each time the routine is invoked, the keypad is scanned to detect keys which have been pressed. When a button on the keypad is pressed, the appropriate flag is set. These flaps are then monitored and reset by other routines.

Figure 7A:
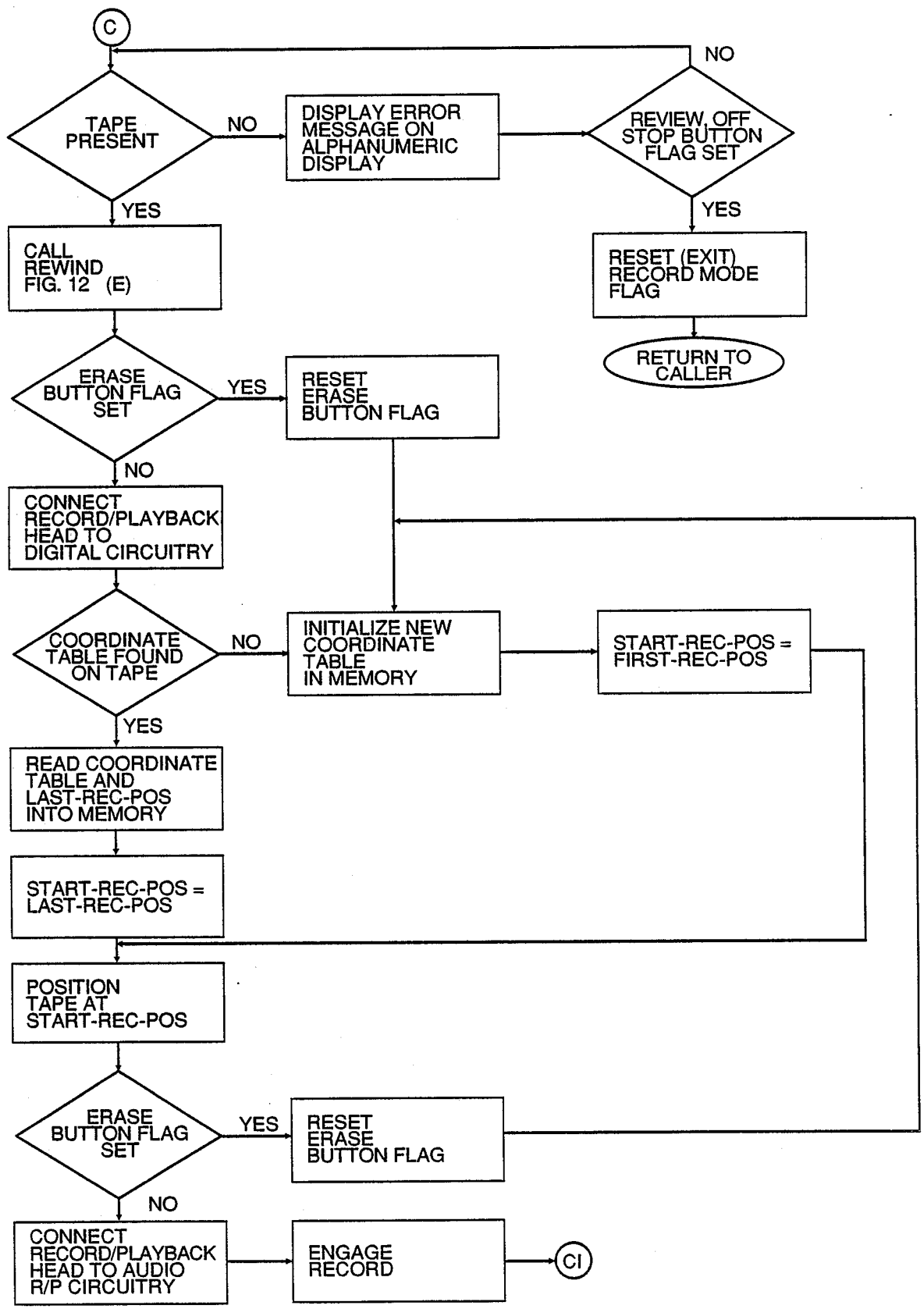
Figure 7B:
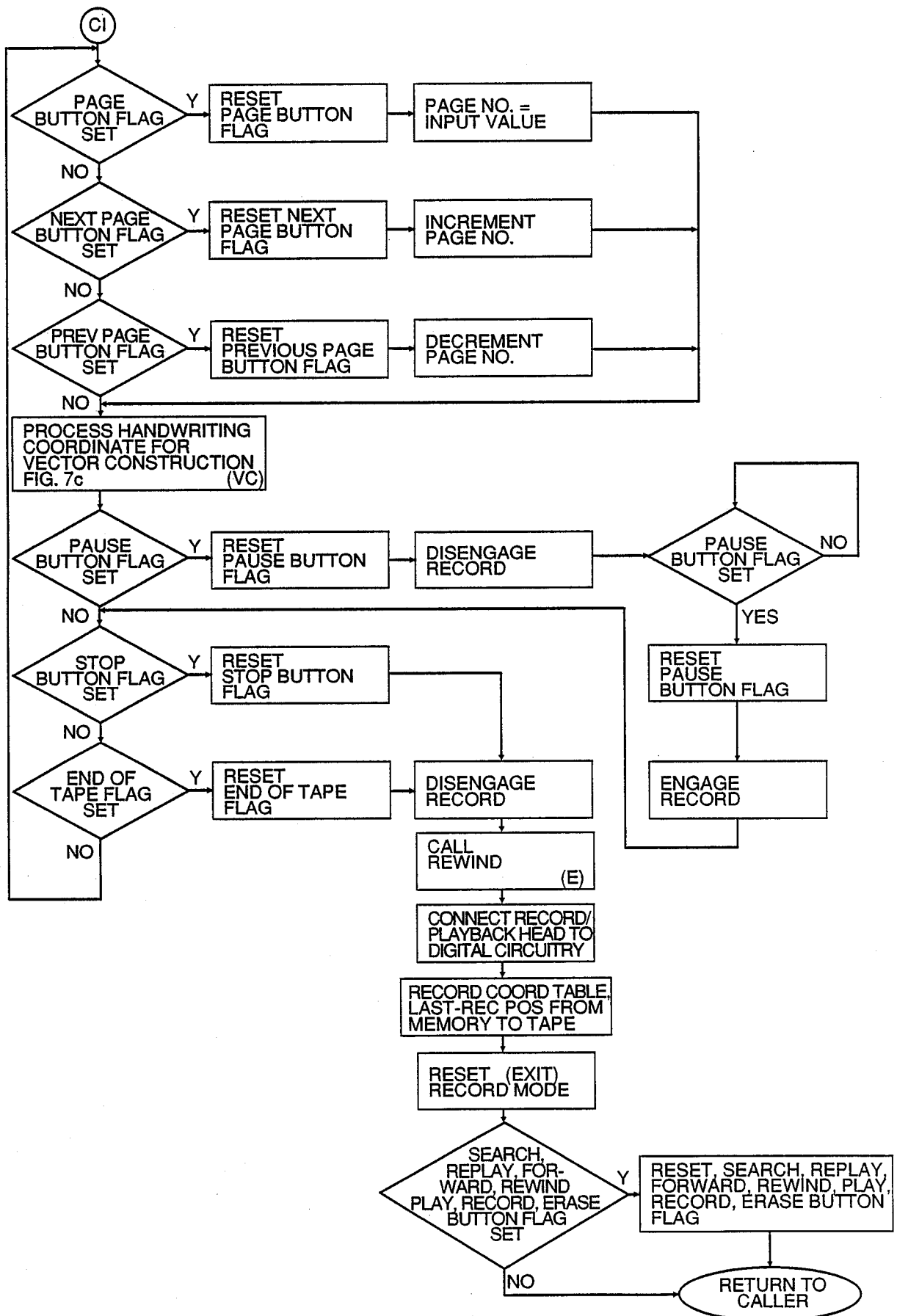
Figure 7C:
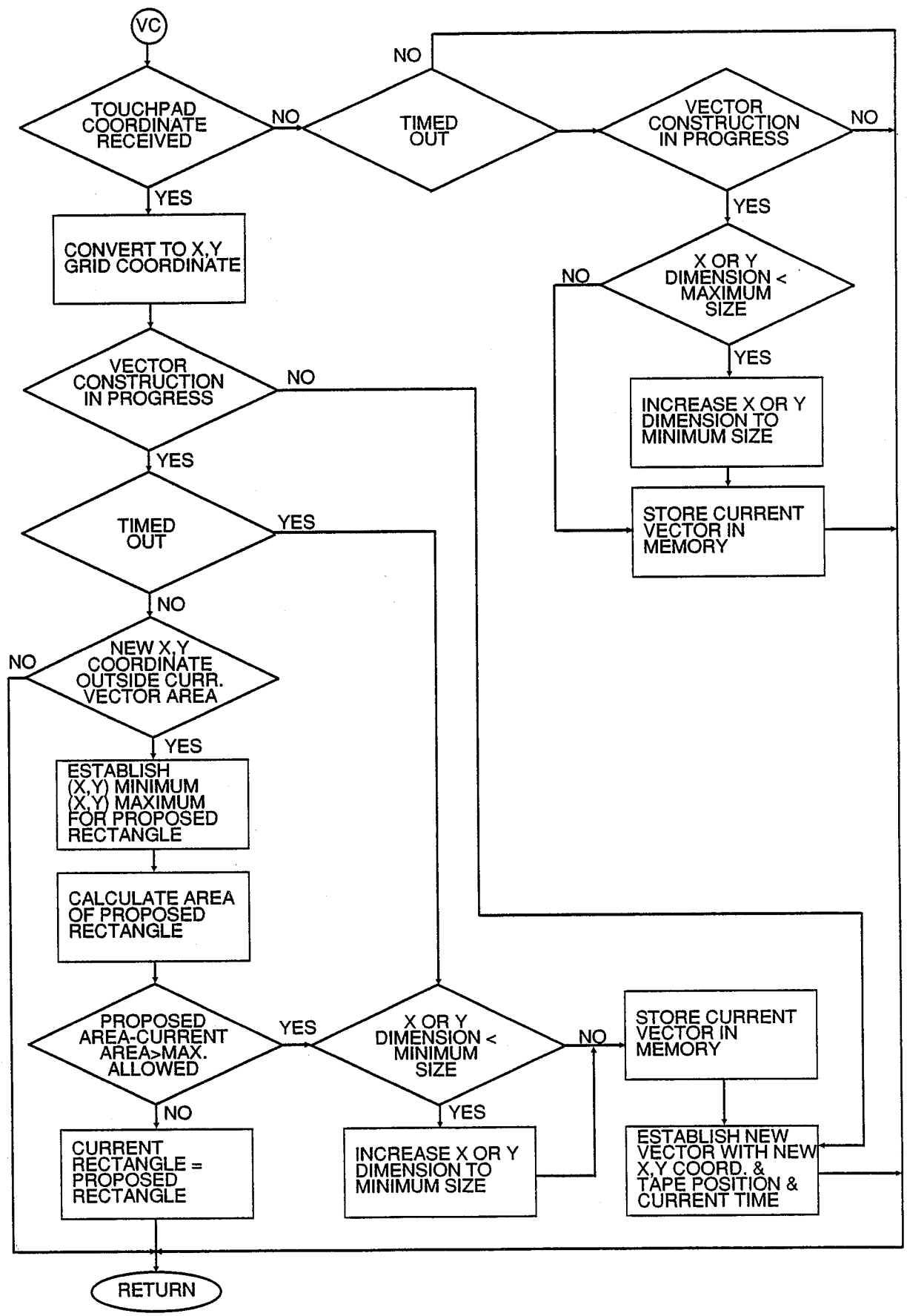

The flow charts of FIGS. 7(a), 7(b) and 7(c) illustrate the workings of the device in the record mode. The record mode is initiated when the user wishes to record, for example, an audio event such as a lecture or speech. While the audio tape recorder is recording this audio event, the microprocessor is storing a series of relationships between audio tape positions and user notations of the audio event at specific points in time. To begin the recording phase, the user inserts a tape in the audio recorder, positions a sheet of standard writing paper on top of the touchpad, enters the current page number on the keypad, and issues the record command to the microprocessor via the user input interface.

This routine first checks to see if a tape is present in the device. If not, an error message is displayed to the operator and the routine proceeds no further in the record mode. If a tape is present and the erase flag has been set, the tape is automatically rewound and initialized to receive a new coordinate table, thus disregarding any previously recorded information on the audio tape. If the erase flag is not set, then depending upon the condition of the tape, a coordinate table from a previous recording is located, or the tape is initialized to receive a new coordinate table if the tape is blank. If one or more coordinate tables are present on the tape, the microprocessor reads the coordinate table and the last recording position into memory. The present recording session will then begin at the position where the last recording session ended. The tape is positioned at this point and the record/playback head is connected to the audio record/playback circuitry to begin recording.

As shown in FIG. 7(b), when the user changes pages during the recording phase, this is indicated to the device by pressing the next page or previous page buttons on the keyboard or entering a numeric value for the page number. If the next page or previous page buttons are pressed, the routine resets the appropriate button flag and increments or decrements the page number respectively. If the user enters a numeric value, the routine accepts the inputted value and resets the page button flag. After checking for page changes, the routine processes any one handwriting coordinate received from the touchpad during the correlation vector construction phase of the record mode which is explained in detail by FIG. 7(c).

If the user wishes to suspend the recording session momentarily, the pause command is initiated through the user input interface. The routine resets the pause button flag, disengages the recorder mechanism and waits for the user to resume recording. When the user activates the pause command again, the routine resets the pause button flag and engages the recorder mechanism.

The microprocessor senses the end of the audio tape during the recording mode by monitoring the tape motion detector. When audio tape motion stops, the routine resets the end of the tape flag, disengages the recorder mechanism, rewinds the audio tape to the beginning, connects the record/playback head to the digital record/playback circuitry and records the coordinate table and last recorded position onto the audio tape. At this point, the routine returns control to the main subroutine. If the user wishes to continue recording, he must then flip the cassette over or insert another cassette and begin another recording phase as described above.

When the user wishes to end the recording session, the stop command is initiated through the user input interface. The routine resets the stop button flag, disengages the recorder mechanism, rewinds the tape to the beginning, connects the record/playback head to the digital record/playback circuitry, records the coordinate table and last recorded position onto the audio tape, and returns control to the main routine to await the input of additional commands.

During the construction of the correlation vectors as shown in FIG. 7(c), the microprocessor checks for a touchpad coordinate generated by the user's handwriting. If a coordinate is not present and the correlation vector's timeout period has not ended, control returns to the calling routine. However, if the timeout period has ended, the routine must complete any vector currently under construction. When there is no vector under construction, the routine returns to the calling routine. However, if a vector is under construction, the routine checks to see that minimum area requirements are met by checking the x and y dimensions of the vector's rectangle. If the minimum size requirements in either direction are not met, the routine enlarges the rectangle in the appropriate dimension before storing the current correlation vector and returning to the calling routine. If a coordinate is received from the touchpad before the timeout period ends, the routine converts the raw coordinate into an x, y coordinate pair that conforms to the grid size and resolution established by the program. If there is not a correlation vector currently under construction, the routine begins a new correlation vector using the new x, y coordinate, the current page number and the corresponding tape position. Also, a timeout period for this vector is initiated by noting the current time. Control then returns to the caller. When a correlation vector is in progress and it has aged past a predetermined limit, the routine checks the vector's rectangular area and, if necessary, increases the x and/or y dimension to meet minimum size requirements before storing the vector. Then the new x, y coordinate, current page number and corresponding tape position are used to start a new correlation vector and an associated timeout period is begun. However, if the vector is not too old, the routine checks to see if the new x, y coordinate is the same as the previous coordinate received from the touchpad or if the coordinate is contained within the current vector's rectangular area. If either is true, the routine exits and returns to the calling routine since the new coordinate will not result in a change to the current correlation vector. If neither case is true, the routine uses the new x, y pair to temporarily enlarge the current rectangle and calculate its area. When the difference between the area of the enlarged rectangle and the area of the rectangle before enlargement is greater than a predetermined threshold value, the routine will not proceed with the enlargement but will store the current vector after checking to see that minimum area requirements are met. Then the routine starts a new correlation vector with the unused x, y coordinate, current page number and corresponding tape position and begins an associated timeout period before returning to the calling routine. However, if the area added by the enlargement of the rectangle is not greater than the predetermined threshold value, the enlargement of the current vector's rectangle takes place and the routine returns to the caller.

Figure 8A:
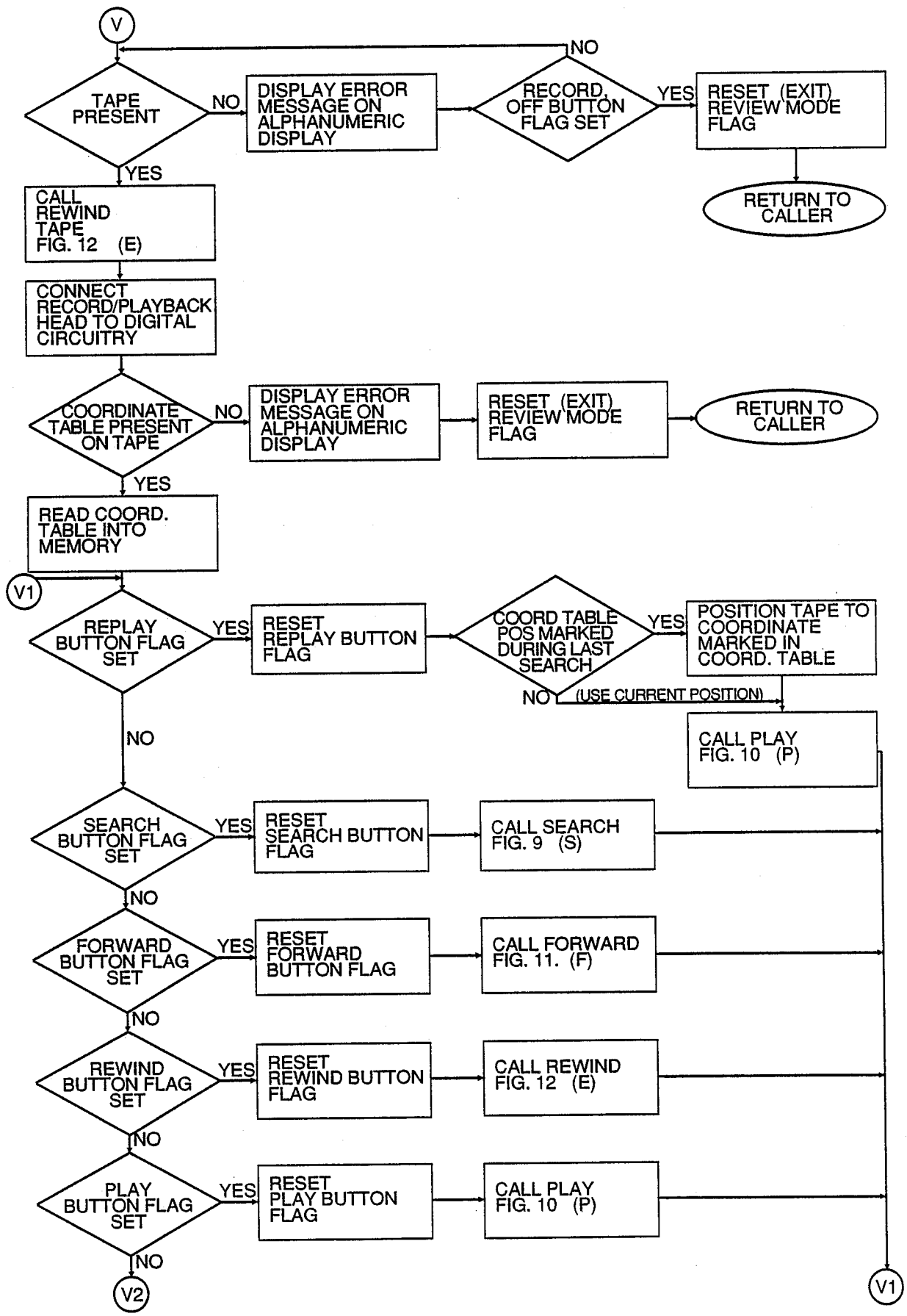
Figure 8B:
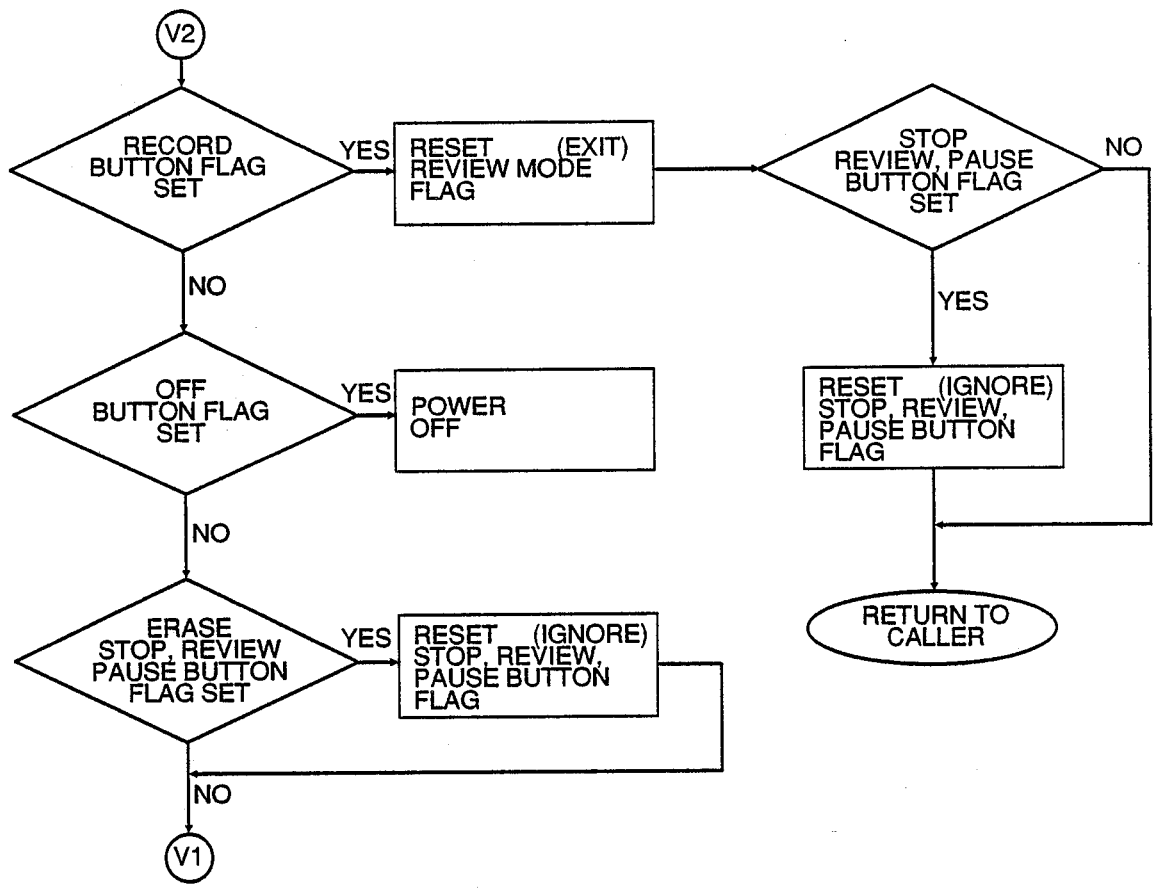

The flow charts of FIGS. 8(a) and 8(b) illustrate operation of the device in the review mode. The review mode is used when the user wants to review handwritten notes from a previous recording session and play back sections of the audio tape which correspond to items of interest in the handwritten notes. The user inserts the tape pertaining to the notes and initiates the review mode. This routine first checks to see if a tape is present in the device. If not, an error message is displayed to the operator and the routine proceeds no further in the review mode. If a tape is present, the routine automatically rewinds the tape, connects the record/playback head to the digital record/playback circuitry, and reads the coordinate table from the audio tape through the digital record/playback interface into memory. If the coordinate table is not found on the tape, the routine displays an error message and proceeds no further. Once the coordinate table is established in memory, the user may choose from a variety of commands within the review mode such as replay, search, forward, rewind and play. When the replay mode has been activated to replay the portion of the tape found during the last search, the routine resets the replay button flag, positions the tape to the audio tape coordinates found during the last search, and calls the play routine (FIG. 10). If a search has not been conducted prior to activating the replay command, this routine uses the current position from which to start playback. For search, forward, rewind and play, the routine resets the appropriate button flag and calls the corresponding routine (FIGS. 9, 11, 12 and 10, respectively). If the user activates the record mode during the review mode, the routine exits the review mode. Upon encountering the off flag, the routine simply turns the power off. Inappropriate commands such as erase, stop, review and pause are ignored by this routine which simply resets the appropriate flag and continues.

Figure 9:
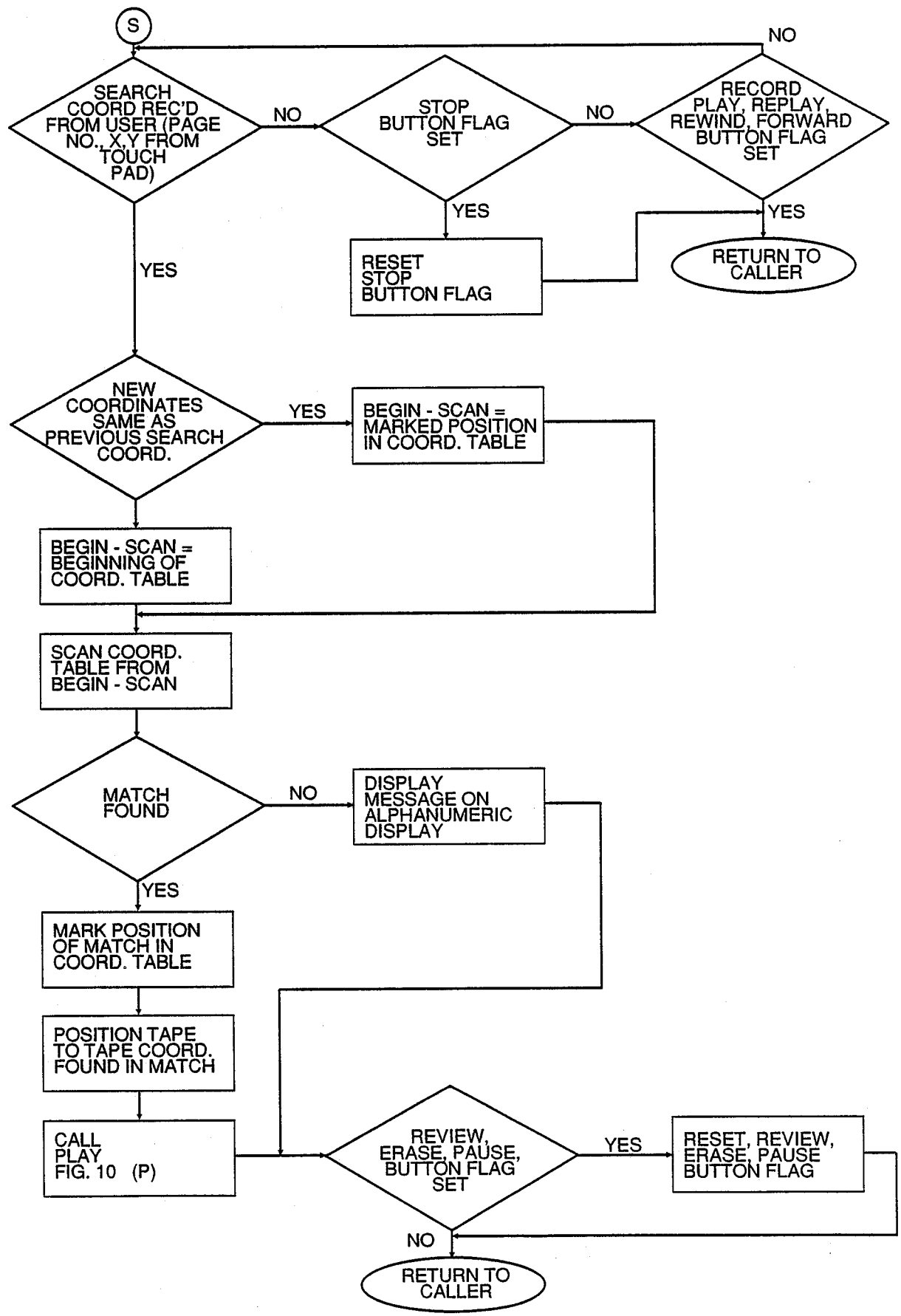
Figure 10:
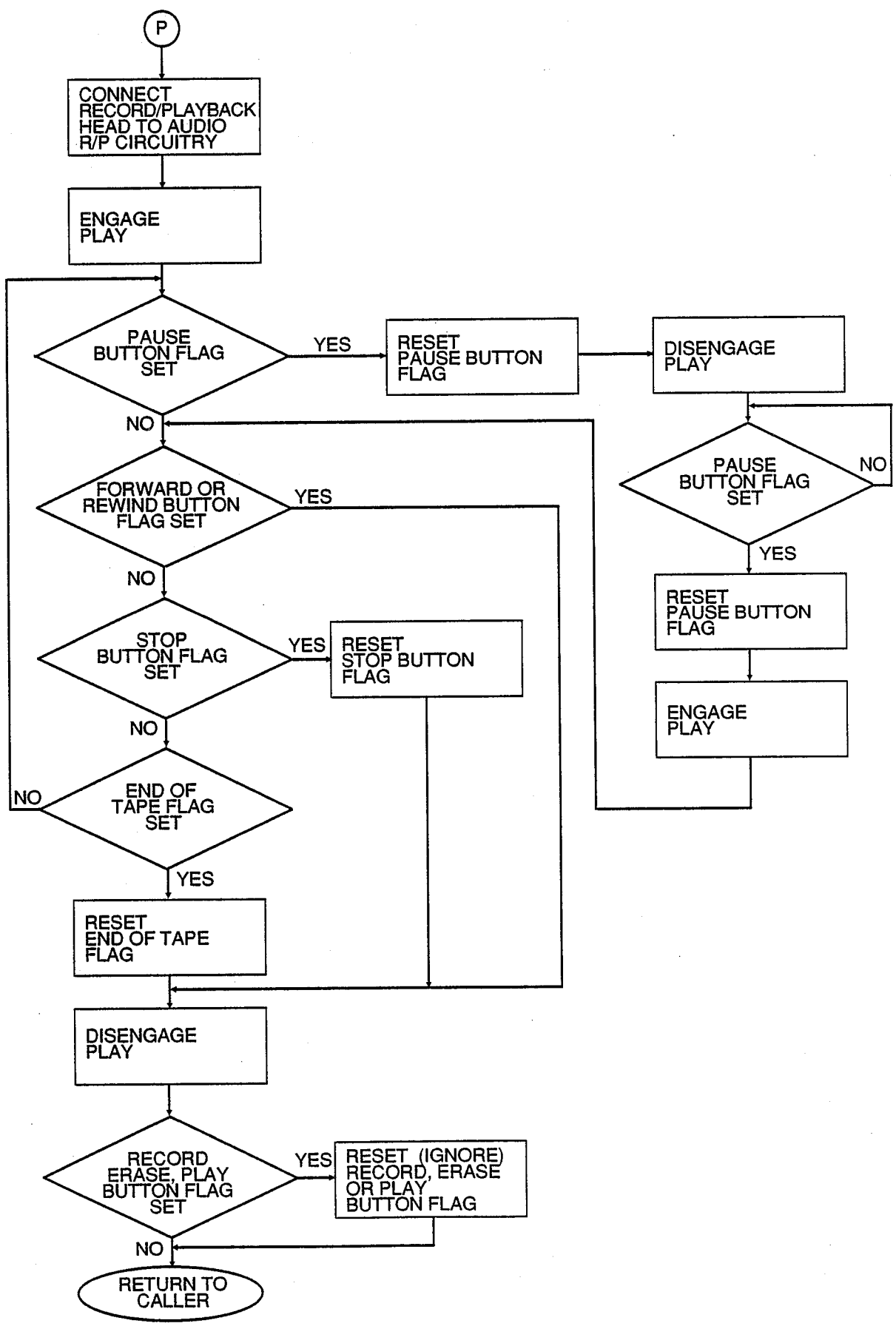

The flow chart of FIG. 9 illustrates operation in the search mode. When the user finds a particular item in the handwritten notes and would like to play back the corresponding section of the audio tape, the search command is initiated. To input the search coordinates, the user positions the page of notes on the touchpad and indicates the appropriate location on the notes by inputting the appropriate page number through the keypad and by touching or pointing to the item of interest on the page with a pen, stylus, or other instrument. If the routine receives another command before receiving the search coordinates, it returns control to the calling routine. When the search coordinates are received, the routine compares the current search coordinates received from the user with the search coordinates used for the previous search, and if they are the same, begins the memory search from the last marked position in memory in an attempt to find another match. Otherwise, the routine begins the search at the beginning of the coordinate table. If no match is found for the user input search coordinates, the routine displays an error message and exits the search mode. However, if a coordinate match from the memory table is found, the memory table position is marked and the tape element of the correlation vector is retrieved from the coordinate table and used to position the tape. The routine then connects the record/playback head to the audio record/playback circuitry, activates the play routine (FIG. 10) and exits the search mode when control is returned from the play routine. Inappropriate commands such as review, erase and pause are ignored by this routine.

The flow chart of FIG. 10 illustrates operation of the device in the play mode which allows the user to listen to the recording on the audio tape. Since play does not require the use of a coordinate table, this command can be employed to use of the audio recorder as a playback device for any type of prerecorded tape. The routine connects the record/playback head to the audio record/playback circuitry and engages the play mode. If a pause is initiated by the user, the routine resets the pause button flag, disengages the play mode and waits for the user to resume playback. When the user activates the pause command again, the routine resets the pause button flag and engages the play mode. If the forward or rewind command is activated, the routine disengages the play mode and returns to the calling routine which will then service the requested command. The play mode is terminated with the stop command or when the end of the tape is encountered. The routine then resets the appropriate flag, disengages play mode and exits. Commands such as record, erase and play are ignored by this routine.

Figure 11:
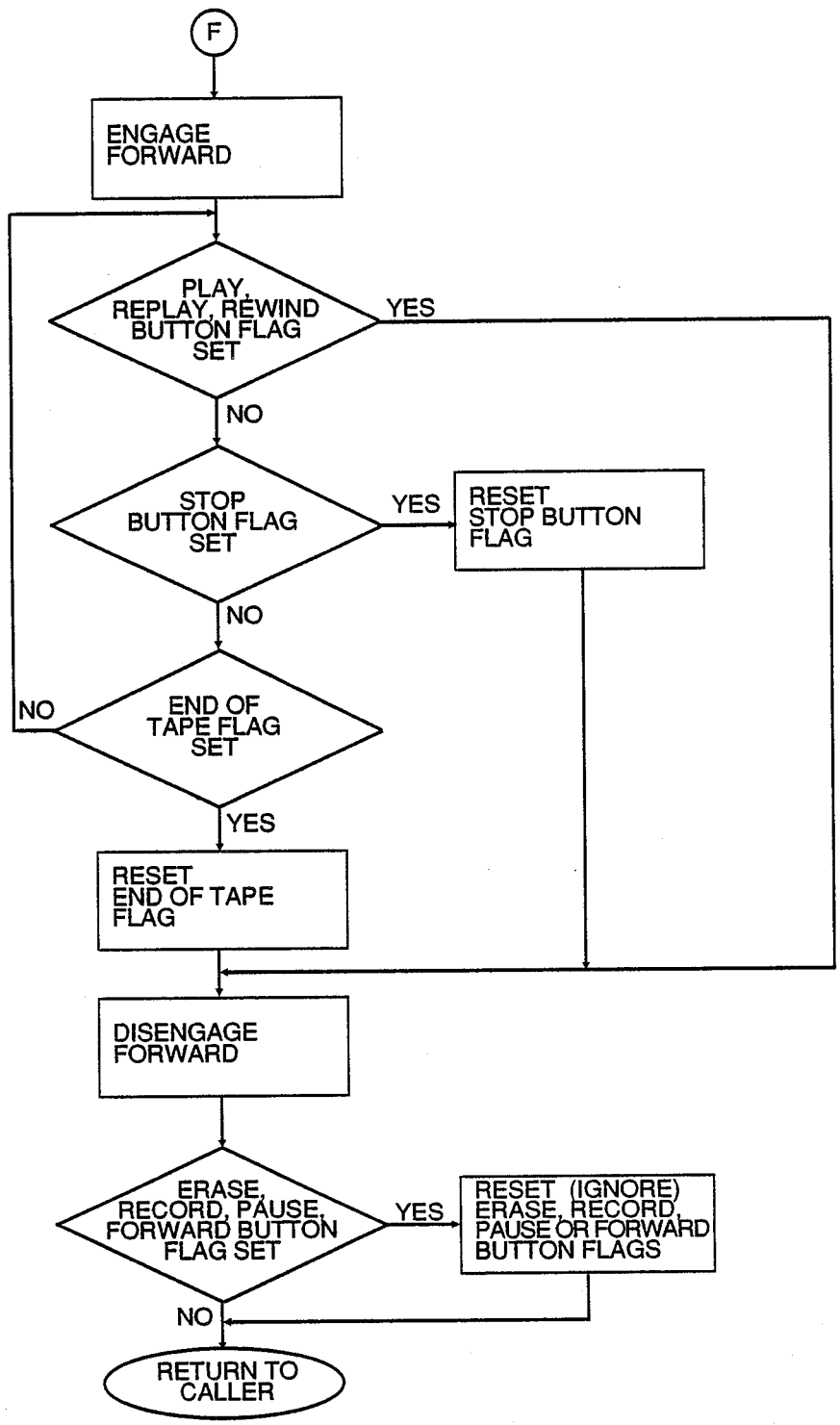

The flow chart of FIG. 11 illustrates the forward mode of operation which is used to reposition the tape and can be used directly or in conjunction with the review phase. After the routine engages the forward mode, a play, replay or rewind command will cause the routine to disengage forward and return to the calling routine which will service the requested command. If a stop command is issued or the end of the tape is encountered, the routine will reset the appropriate flag, disengage forward and exit. Inappropriate commands such as erase, record, pause and forward are ignored by this routine.

Figure 12:
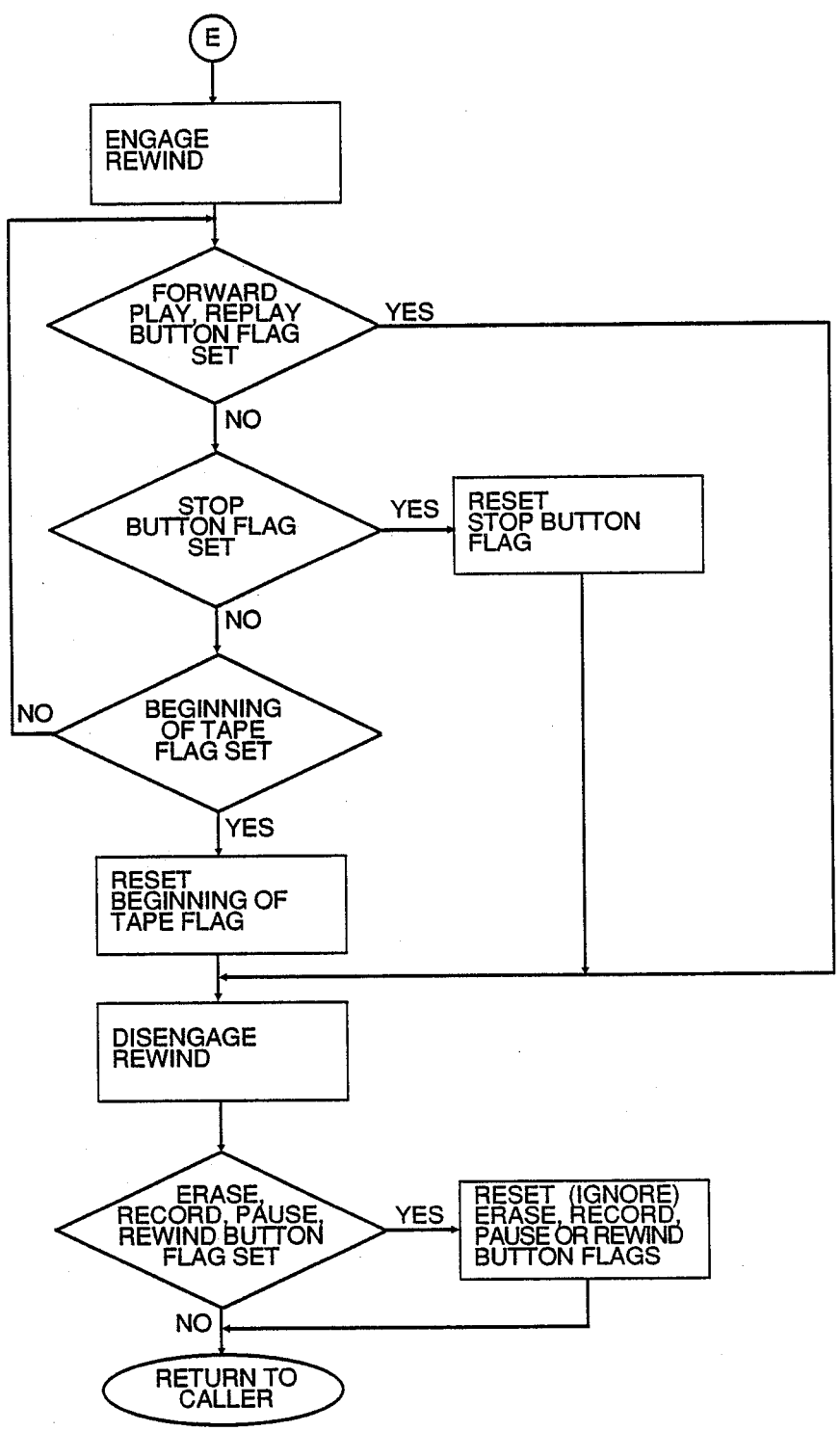

The flow chart of FIG. 12 illustrates the rewind mode of operation which is used to reposition the tape and can be used directly or in conjunction with the review phase. After the routine engages the rewind mode, a play, replay or forward command will cause the routine to disengage rewind and return to the calling routine which will service the requested command. If a stop command is issued or the beginning of the tape is encountered, the routine will reset the appropriate flag, disengage rewind and exit. Inappropriate commands such as erase, record, pause and rewind are ignored by this routine.

CONSTRUCTION OF CORRELATION VECTORS

To construct the vectors that correlate handwritten text to audio tape positions, the routine must first combine incoming data from the touchpad into cohesive groups, each group representing one particular area of handwritten text. To form a correlation vector, each area of text is combined with a tape position that correlates to the instant in time when the handwriting within that area began.

In deciding upon a shape to enclose an area of handwritten text for each correlation vector, several factors should be considered. Since the amount of memory space for correlation table storage may be limited, the amount of storage available for each individual correlation vector is preferably minimized. Therefore, it is necessary to be able to represent the boundaries of the area with as few points as possible. The shape of the text area must also be easy to analyze during the searching phase of review mode since the program must be able to quickly determine if the requested search point is contained within a particular vector.

Another consideration is that each area of text be large enough so the user can point to any position on a handwritten note and the device will find the point to be within the area of the proper vector during the search of the correlation vector table. Note that when a user enters the review mode and positions a page of notes on the touchpad, it is unlikely that the page will align in exactly the same position in which the notes were written during the recording mode. If the vector areas are small relative to the text they enclose, the coordinate of a position in the notes during the review mode and the coordinate of the same position during the record mode will not correspond and the user may "miss" pointing within the vector's area.

On the other hand, a vector's area must not be so large that it encloses areas of the page that do not pertain to the text of the current vector. This could lead to an overlapping of the areas of numerous vectors and thereby create problems for the searching process. For example, if a user requests a search for a note's position that is contained in several large overlapping vectors, the device might have to retrieve several tape positions before it finds the one the user needs.

A final consideration concerns the time frame in which the correlation vectors must be created. If the algorithm to construct each vector relies on a knowledge of the distribution and characteristics of the surrounding text, then large amounts of text coordinates from the touchpad as well as the tape positions corresponding to each coordinate would need to be accumulated before the algorithm could begin construction of the correlation vectors. Since this requires large amounts of storage, a better approach is to create the vectors in real time. Therefore, the shape used to surround a vector's area of text must lend itself to construction in real time.

One possible implementation might be to use an irregular shape to enclose each area of text. With this implementation, the shape of the area can closely follow the contour of the handwritten text, thus reducing the likelihood of overlapping vectors, while at the same time allowing large areas which are easy to point to.

However, since accurate representation of an irregular shape requires a large number of points, a large amount of storage would be required for each vector. Further, the searching process would be difficult and would involve a complex algorithm for determining if a requested search coordinate is contained in a vector's irregularly shaped area. Also, an irregular shape is difficult to create in real time since it requires prior knowledge of the surrounding text in order to determine its shape.

The preferred embodiment of the present invention uses a rectangle to enclose areas of text. Storage requirements for the associated vector are small since a rectangle can be represented with only two points. Determining if a requested search coordinate is contained in a particular vector's area requires only four comparisons. The rectangle is also simple to construct in real time since, initially, it encloses one handwriting coordinate and expands to enclose future coordinates by changing one or both of the points representing its boundaries. The rectangular shape encloses a large enough area around the text so a user will not "miss" pointing within a vector's area when requesting a search for a particular item of the handwritten notes.

A problem can arise, however, if the rectangle begins enclosing too much nonessential area with the addition of a new handwriting coordinate. This can create overlapping vectors and make it difficult for the search process to find the correct tape position for a requested item from the notes.

In order to combine coordinates received from the touchpad into rectangular areas, the program within the microprocessor views the writing surface of the touchpad as a grid of 128×256 individual coordinates. Each incoming coordinate is converted to represent one x, y coordinate of this grid. The actual construction of a rectangular area for each vector begins with a rectangle enclosing the first x, y coordinate received from the touchpad. As the user continues writing and more coordinates are received, the rectangle expands to enclose any new coordinate outside the bounds of the current rectangle. The problem of overlapping vectors arises when the expansion of the rectangle allows the inclusion of too much non-related area which can result in overlapping vectors. For example, if an L-shaped bracket is drawn by a user, the vector's rectangle begins by enclosing the down stroke of the bracket with the enclosure of very little new area with the addition of each coordinate. However, as the pen starts on the sideward stroke, each new coordinate from the touchpad causes the rectangle to expand to add an area equivalent to the entire length of the down stroke. As the rectangle expands in this fashion, it potentially may begin to overlap several other vectors.

To help alleviate this problem, the expansion of the rectangle needs to be monitored closely. If the rectangle expands to include another touchpad coordinate and the new area added exceeds a predetermined threshold value, the expansion will not take place. Instead, the vector will be stored in the correlation table and the new coordinate used to start another correlation vector. The effect of this monitoring is to produce smaller vectors with fewer instances of overlapping areas.

In the construction of a vector's rectangular area, a time factor must also be considered in order to prevent the area from becoming too old. This is important since the older an area becomes, the more recording time it represents. Since the tape position for each correlation vector represents the instant in time when the text of the vector begin, the search for a coordinate which was added late in the construction of the vector will likely produce a tape position earlier in time than the user wants.

Since there is a maximum time limit for construction of a vector and a maximum allowable area to be added to a vector with each new coordinate, it is possible that a vector could be created with an area enclosing only one coordinate or a single line of coordinates. With an area so small or so narrow, the realignment of the page of notes may not be accurate enough to allow the user to point within the area of such a vector during the searching process. Therefore, the algorithm must evaluate each completed vector and if the x and/or y dimensions do not meet a minimum size standard, the algorithm will increase the appropriate dimension of the area before storing the vector in the correlation table.

SUMMARY OF OPERATION OF DEVICE

At the risk of some redundancy, the operation of the preferred embodiment of the device will be briefly described again. To begin recording, the user inserts a tape in the recorder, positions a sheet of standard writing paper on top of the touchpad, enters the current page number on the keypad, and issues the "record" command on the keypad. At this point, the microprocessor attempts to read the directory from the audio tape. If the tape is blank, a directory is initialized in memory and the audio tape is positioned to begin recording. If the tape has been previously recorded, the directory is read into memory and the tape positioned to append the current recording session at the end of the previous session. If the user wants to re-record a previously recorded tape, an "erase" command is issued and all information on the audio tape is ignored. The microprocessor then engages the recorder.

As the audio recorder is recording and the user is writing, the microprocessor is accumulating a correlation between the user's current position on the page and the audio tape's current position. To end the recording phase, the user enters the "stop" command. The microprocessor will automatically rewind the audio tape and record the directory of correlation information onto the tape in a reserved area.

When the user changes pages during the recording phase, the device is notified by pressing the "next page" or "previous page" button on the keypad, or entering a numeric value for the page number.

If the end of the audio tape is encountered during the recording phase, the microprocessor will automatically end the recording phase, rewind the audio tape and record the directory of correlation information onto the tape. The user may then flip the cassette over or insert another cassette and begin another recording phase as described above.

The user may momentarily suspend the recording process by issuing the "pause" command. This causes the audio recording process to the halted, but does not rewind the tape to save the directory of correlation information. Pressing the "pause" command again resumes the recording phase.

When the user wants to review the handwritten notations, the cassette that pertains to the notations is inserted, a page of notes is positioned on the touchpad, and the "review" command is issued. The microprocessor then loads the directory into memory from the audio tape. To playback the audio tape segment relating to a specific item in the notes, the user issues the "search" command, enters the number of the page being reviewed and positions a pen, stylus or finger on the item in the notes. The microprocessor searches the directory of correlation information that was accumulated during the original recording session to find the section on the audio tape that corresponds to the requested item in the notes, then positions the audio tape at that section and begins playback of the tape. The user must stop the playback when the review is finished.

If the user wishes to listen to the same section again, the "replay" command is issued and the microprocessor rewinds the audio tape to the same starting location found in the last search and begins playback.

During the recording phase, the user may occasionally backtrack and write something in essentially the same location as a previous note. When this happens, a particular position in the notes may have more than one corresponding position on the audio tape. In this case, the first match found during the search may not playback the item that the user wanted. Therefore, the user reissues the "search" command and indicates the same position in the notes. The microprocessor will position the tape to the next corresponding tape location found in the directory and begin playback.

If a match cannot be found for the item the user is requesting, the microprocessor alerts the user with a tone and provides a message to that effect on the alphanumeric display.

The device can also be used as an ordinary playback device. User initiated movement of the audio tape is accomplished with the "forward" and "rewind" commands and terminated with the "stop" command. The user can playback from any position on the audio tape with the "play" command and momentarily halt playback with the "pause" command.

From the preceding description of the preferred embodiments, it is evident that the objects of the invention are attained. Although the invention has been described and illustrated in detail, it is to be clearly understood that the same is by way of illustration and example only and is not to be taken by way of limitation. As noted previously, the invention is not limited to the use of any particular recording technology (such as audio or video recording), nor to the use of a particular recording medium. Although examples of possible applications have been noted, no attempt to be exhaustive in this regard has been made. Substantial modifications to the preferred embodiment illustrated and described are possible without departing from the present invention. The spirit and scope of the invention are to be limited only by the terms of the appended claims.

What is claimed is:

1. An arrangement for recording information relating to an event on a recording medium, and for indexing handwritten notations concerning the event to the recorded information, comprising:
    a recording device for recording information onto a recording medium;
    means for receiving handwritten notations on a writing surface;
    means for sensing relative positions of the recorded information on the recording medium, and for sensing positions of corresponding handwritten notations on the writing surface;
    means for correlating the respective positions of the recorded information to the positions of the handwritten notations; and
    playback means for locating and reproducing portions of the recorded information in response to identification of corresponding portions of the handwritten notations.

2. An arrangement according to claim 1, wherein said means for correlating includes a microprocessor which receives, from the recording device and the means for receiving handwritten notations, information relating to the relative positions of the recorded information and the handwritten notations on the recording medium and writing surface, respectively, and which stores said information in a correlation table.

3. An arrangement according to claim 2, wherein said correlation table comprises a plurality of correlation vectors, and wherein each correlation vector represents an area on said writing surface and a corresponding position on the recording medium.

4. An arrangement according to claim 3, wherein the areas on the writing surface corresponding to each correlation vector are of a predetermined size and shape.

5. An arrangement according to claim 4, wherein said areas are rectangular in shape.

6. An arrangement according to claim 4, wherein said areas are equivalent to or larger than a predetermined minimum size.

7. An arrangement according to claim 4, wherein said areas are equivalent to or smaller than a predetermined maximum size.

8. An arrangement according to claim 2, wherein said correlation table containing positional information is stored on the recording medium.

9. An arrangement according to claim 2, wherein said recording device is an audio cassette recorder and wherein said recording medium is a cassette tape.

10. An arrangement according to claim 9, wherein said correlation table is stored on said cassette tape.

11. An arrangement according to claim 1, wherein said means for sensing the positions of the handwritten notations on the writing surface include means for sensing a position of a writing instrument on the writing surface.

12. An arrangement according to claim 1, wherein said writing surface is one of an electronic touchpad, a flexible membrane switch, and an electronic bit pad.

13. An arrangement according to claim 1, wherein said recording device is a video recording device and wherein said recording medium is a video recording medium.

14. An arrangement according to claim 1, wherein said recording device is an audio cassette recorder and wherein said recording medium is a cassette tape.

15. An arrangement according to claim 1, wherein said arrangement further includes a keyboard for entry of control instructions by an operator.

16. An arrangement according to claim 1, wherein said arrangement further includes an alphanumeric display for providing information to an operator.

17. An arrangement according to claim 1, wherein said means for correlating includes a microprocessor which receives, from the recording device and the means for receiving handwritten notations, information relating to the relative positions of the recorded information and the handwritten notations on the recording medium and writing surface, respectively, and which stores said positional information in a correlation table; and wherein said arrangement further includes a keyboard, connected to the microprocessor, for entry of control instructions by an operator; and wherein said arrangement further includes an alphanumeric display, connected to the microprocessor, for providing information to the operator.

18. A machine method for recording information relating to an event on a recording medium and indexing the recorded information to handwritten notations concerning the event, comprising the steps of:
    making a continuous recording of information on a recording medium throughout a designated time interval;
    making handwritten notations on a writing surface during said time interval;
    sensing the relative positions of the recorded information on the recording medium, and of the handwritten notations on the writing surface;
    correlating the respective positions of the recorded information to the positions of corresponding handwritten notations; and
    reviewing a portion of the recorded information by identifying the position of a corresponding handwritten notation, and subsequently locating and reproducing a portion of the recorded information which corresponds to the identified handwritten notation.

19. A machine method according to claim 18, wherein the step of correlating the respective positions includes the step of storing the positions of the recorded information and the handwritten notations in a correlation table.

20. A machine method according to claim 19, wherein the step of storing the positions of the recording information and handwritten notations in a correlation table includes the step of constructing a plurality of correlation vectors, and wherein each correlation vector represents an area on said writing surface and a corresponding position on the recording medium.

21. A machine method according to claim 20, wherein each of said correlation vectors is constructed in real time as said designated time interval elapses, and wherein each of said vectors represents a predetermined maximum fractional portion of said designated time interval.

22. A machine method according to claim 20, wherein the areas on the writing surface corresponding to each correlation vector are of a predetermined size and shape.

23. A machine method according to claim 22, wherein said areas are rectangular in shape.

24. A machine method according to claim 22, wherein said areas are equivalent to or larger than a predetermined minimum size.

25. A machine method according to claim 22, wherein said areas are equivalent to or smaller than a predetermined maximum size.

26. A machine method according to claim 19, wherein the step of reviewing a portion of the recorded information includes the steps of:
comparing the position of the corresponding handwritten notation to the positions of the handwritten notations listed in the correlation table to identify a match;
using the corresponding position in the correlation table to locate a portion of the recorded information on the recording medium; and
reproducing the located portion of the recorded information.

27. A machine method according to claim 18, wherein the step of sensing the positions of the handwritten notations on the writing surface includes sensing the position of a writing instrument on said writing surface.

28. A portable device for recording information relating to an event on a recording medium, and for indexing handwritten notations concerning the event to the recorded information, comprising:
recording means for recording information onto a recording medium;
means for receiving handwritten notations on a writing surface;
means for sensing relative positions of the recorded information on the recording medium and for sensing positions of corresponding handwritten notations on the writing surface;
microprocessor means for receiving, from the recording device and the means for receiving handwritten notations, information relating to the relative positions of the recorded information and the handwritten notations on the recording medium and writing surface, respectively, and for storing said information in a correlation table;
input means, connected to the microprocessor, for receiving control commands from a user;
display means for feedback of information to the user; and
playback means for locating and reproducing portions of the recorded information in response to identification of corresponding portions of the handwritten notations.

29. A portable device according to claim 28, wherein said correlation table comprises a plurality of correlation vectors, and wherein each correlation vector represents an area on said writing surface and a corresponding position on the recording medium.

30. A portable device according to claim 29, wherein the areas on the writing surface corresponding to each correlation vector are of a predetermined size and shape.

31. A portable device according to claim 30, wherein said areas are rectangular in shape.

32. A portable device according to claim 30, wherein said areas are equivalent to or larger than a predetermined minimum size.

33. A portable device according to claim 30, wherein said areas are equivalent to or smaller than a predetermined maximum size.

34. A portable device according to claim 28, wherein said recording device is battery-powered.

* * * * *